United States Patent Office 2,937,828
Patented May 24, 1960

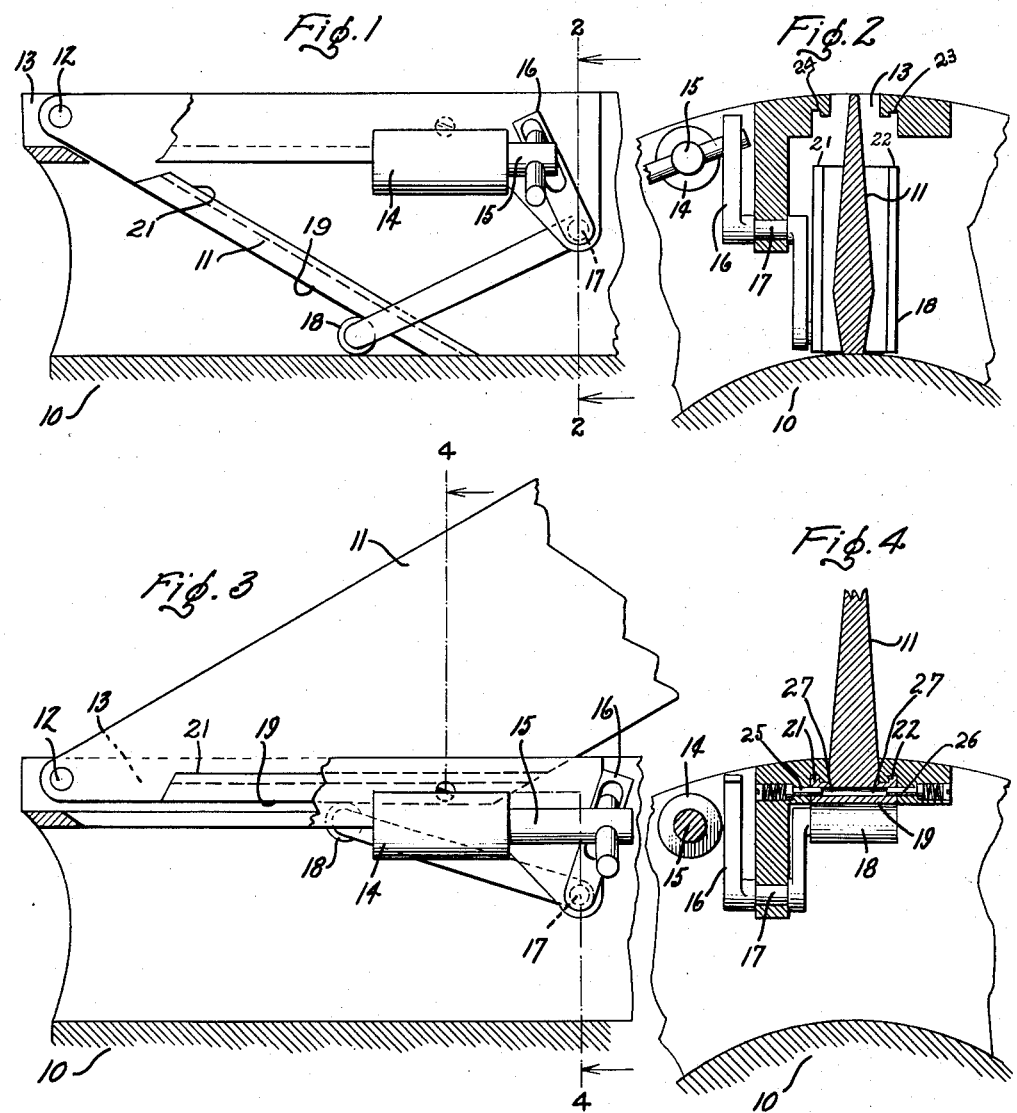

2,937,828

RETRACTABLE FIN MECHANISM

Burton P. Clark and Vincent B. Corbo, Schenectady, N.Y., assignors to General Electric Company, a corporation of New York Filed July 18, 1956, Ser. No. 598,649

3 Claims. (Cl. 244—91)

This invention generally relates to improvements in aircraft appendage structures, and more particularly to improvements in the fin structures of aircraft to facilitate storage, handling, and launching of the aircraft.

The outwardly projecting fin structures used for stabilizing certain aircraft in flight, such as pilotless missiles, usually requires special storage and launching facilities that can accommodate these appendages projecting from the otherwise streamlined aircraft body. These projections are particularly troublesome where the missile is to be released from a submarine or underwater platform through ejectors such as torpedo tubes or the like. Heretofore, attempts have been made to use foldable or collapsible fins to overcome this difficulty. However, known folding or collapsible fin structures have met with a notable lack of success due to the limited space and weight requirements of the means for operating and housing these fins.

In accordance with the present invention, there is provided a unique means for housing the stabilizing fin members in retracted position within a streamlined aircraft body during handling and launching together with a compact reliable mechanism for positively positioning these fins outwardly from their housed position, as necessary, after launching to stabilize the aircraft in flight.

It is accordingly one object of the present invention to provide a compact, light weight, and reliable mechanism for retaining the stabilizing fins of missile in retracted position prior to launching and for positioning these fins in a suitable manner to stabilize the craft in flight after launching.

Other objects and many attendant advantages of this invention will be more readily comprehended to those skilled in the art upon a detailed consideration of the following drawings taken with the accompanying specifications:

Fig. 1 is a partial sectional view, in side elevations, illustrating one preferred embodiment of the present invention, Fig. 2 is an end view through line 2—2 of Fig. 1, Fig. 3 is a view similar to Fig. 1 illustrating the fin structure in its outward position, and Fig. 4 is an end view through line 4—4 of Fig. 3.

Referring now to Figs. 1–4 inclusive, for a detailed consideration of one preferred embodiment of the present invention, there is generally shown the portion of the streamlined rear body of a rocket engine propelled missile 10, substantially circular in cross section as shown by Fig. 2, within which is housed in retracted position (Figs. 1 and 2) at least one stabilizing fin member 11 having the desired airfoil surface configuration. Fin 11 is pivotally connected to the aircraft frame at 12 and adapted to be raised and lowered, as an integral unit, into and out of the aircraft body through an elongate slotted opening 13 in the body. It is evident from Figs. 1 and 2 that with fin 11 in retracted position, the rear portion of the missile is completely streamlined and a number of such missiles may be compactly stored and handled as well as being ejected through tubes having an inner diameter slightly greater than the diameter of the missile body.

To position fin 11 outwardly from its housing, there is provided a suitable actuator 14, which may be of the hydraulically operating type adapted to reciprocably position a drive shaft 15. Connected to be driven by shaft 15 is an L-shaped bell crank lever 16 pivotally mounted within the aircraft to rotate within a suitable bearing 17 as shaft 15 is driven by the actuator 14. Thus, as shaft 15 is driven to the right in Fig. 1, it rotates bell crank 16 in a clockwise direction within bearing 17.

At the end of bell crank 16 is rotatably mounted a roller 18 upon which the lower inclined surface 19 of fin 11 rests. Counterclockwise rotation of the crank 16 about pivot 17 raises this roller in an upwardly moving arc along the inclined fin surface 19, raising the fin 11 about its pivot 12 while allowing this roller to ride upwardly along the inclined fin surface to its position shown in Fig. 3. Thus, the fin is integrally raised from its housed position within the aircraft body as the actuator 14 is operated.

As fin 11 is rotated upwardly about its pivot 12 and reaches the position shown in Fig. 3, stop means are provided to limit the outward travel of this fin upon its reaching a given position outside the craft. These stop means are preferably comprised of L-shaped flange rails 21 and 22 (Fig. 4) integrally formed to extend outwardly along either side of the base of the fin 11 and which are adapted to enter and mate within suitable U-shaped grooves 24 and 23, respectively, formed inside the craft frame. Upon fin 11 being properly positioned outside of the craft, rails 21 and 22 enter within the grooved frame and further outward movement of the fin is prevented.

To lock fin 11 in place in this outward position in such a manner as to render it insensitive to vibration and shock, suitable means such as a pair of shear pins 25 and 26 are positioned within the craft frame on opposite sides of the fin and are spring urged against the side surfaces of the fin, as shown. As the fin 11 reaches its desired outward position, these shear pins are pressed into a suitable opening 27 in the fin 11 as best shown by Fig. 4, to positively lock the fin against further movement in either direction into or out of the craft housing. Thus, the combination of the fin flange rails 21 and 22 and the shear pins 25 and 26 positively lock the fin in the desired outward position on the craft.

Suitable means (not shown) are, of course, provided to energize actuator 14 after the craft has been launched from its ejecting means, thereby enabling the outward positioning of the fin 11 as described above. Similarly, suitable means are provided (not shown) to deenergize the actuator mechanism by operation of limit switches or the like (not shown) to prevent further movement of the drive arm 15 upon fin 11 reaching the desired outward position. Since such means are well known to those skilled in the art, further details are believed unnecessary for an understanding of the present invention.

Although but one preferred embodiment of the invention has been illustrated and described, it is believed evident to those skilled in the art that the compact arrangement and relative simplicity of the preferred retracting mechanism permits a number of such mechanisms to be employed in any given craft as dictated by the number of such appendages or fins required to stabilize the craft. For example, it is evident that a plurality of such mechanisms may be positioned in side-to-side relation about the periphery of the rocket exhaust of a missile, and that each adjoining pair of bell crank mechanisms may be positioned by a single actuator 14. Furthermore, it is believed evident that many changes may be made in the position of the fin and bell crank pivot connections 12 and 17, as well as in the shape, length, direction of movement and the like of the movable members. Consequently, this invention is to be considered as being limited only in accordance with the claims appended hereto.

What is claimed is:

1. In a pilotless aircraft having a stabilizing fin member, means for housing said fin member within the aircraft body prior to launching and positioning said fin outside said body after launching, said means including a means pivotally connecting said fin to said body for rotation as an integral unit into and out of the body in a given plane, a first member pivotally supported by said body for rotation in a plane parallel to that of said fin and having a portion thereof adapted to slidably engage said fin, and means for driving said first member to rotate and thereby position said fin out of said body, stop means coupling the aircraft body and said fin member to limit the outward movement thereof, said stop means having a pair of parallel groove means integral with the aircraft body and a pair of parallel rail means integral with said fin means, said groove means and said pair of parallel rail means operatively mating at the predetermined limit of outward movement, a pair of spring biased shear pins slidably mounted in the aircraft body in a plane perpendicular to the plane of said fin member, aperture means coacting with said shear pins and integral with said fin member to lock against further movement thereof relative to the aircraft body.

2. In the apparatus of claim 1, said first member including a bell crank and said portion thereof including a roller adapted to slidably engage a lower surface of said fin.

3. In a pilotless aircraft having a stabilizing fin member, means for housing said fin within said craft and positioning said fin to project outside said craft, said means including a pivot rotatably connecting said fin to said body for movement as an integral unit into and out of said body in a given plane, a bell crank rotatably supported by said body for movement in a plane parallel to said given plane, a roller means pivotally supported by said crank and slidably engaging the lower edge of the fin, and an activator for rotating said bell crank and thereby raising said fin, a plurality of parallel stop means integral with said body and juxtaposed to the plane of movement of said fin, a number of rail members adapted to mate with said parallel stop means to limit outward movement of said fin relative to said body, locking means coupling with said body and said fin to prevent any relative movement therebetween.

References Cited in the file of this patent

UNITED STATES PATENTS

| | | |
|---|---|---|
| 739,734 | Spear | Sept. 22, 1903 |
| 1,156,970 | Bonard | Oct. 19, 1915 |
| 2,525,899 | Gustafson | Oct. 17, 1950 |
| 2,734,701 | Horton | Feb. 14, 1956 |